(12) United States Patent
Maekawa et al.

(10) Patent No.: US 11,885,909 B2
(45) Date of Patent: Jan. 30, 2024

(54) OBJECT SHAPE DETECTION APPARATUS, VEHICLE INCLUDING THE SAME, AND OBJECT SHAPE DETECTION METHOD

(71) Applicant: Murata Manufacturing Co., Ltd., Kyoto (JP)

(72) Inventors: Takuya Maekawa, Kyoto (JP); Atsuyuki Yuasa, Kyoto (JP); Kazunari Kawahata, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 519 days.

(21) Appl. No.: 16/997,605

(22) Filed: Aug. 19, 2020

(65) Prior Publication Data

US 2020/0379086 A1 Dec. 3, 2020

Related U.S. Application Data

(63) Continuation of application No. PCT/JP2018/041567, filed on Nov. 8, 2018.

(30) Foreign Application Priority Data

Feb. 23, 2018 (JP) ................................ 2018-031394

(51) Int. Cl.
*G01S 7/41* (2006.01)
*G01S 7/02* (2006.01)
(Continued)

(52) U.S. Cl.
CPC ............ *G01S 7/411* (2013.01); *G01S 7/025* (2013.01); *G01S 7/354* (2013.01); *G01S 7/418* (2013.01); *G01S 13/42* (2013.01); *G01S 13/931* (2013.01)

(58) Field of Classification Search
CPC .......... G01S 7/025; G01S 7/411; G01S 7/024; G01S 13/931; G01S 7/026;
(Continued)

(56) References Cited

U.S. PATENT DOCUMENTS 4,106,014 A * 8/1978 Dunn ...................... G01S 7/411
342/361
5,485,160 A * 1/1996 Suganuma ............ G01S 13/343
342/194
(Continued)

FOREIGN PATENT DOCUMENTS

DE 102015200939 A1 * 7/2016
JP H01282487 A 11/1989
(Continued)

OTHER PUBLICATIONS

International Search Report issued in Application No. PCT/JP2018/041567, dated Dec. 11, 2018.
(Continued)

*Primary Examiner* — Olumide Ajibade Akonai
(74) *Attorney, Agent, or Firm* — Pearne & Gordon LLP

(57) ABSTRACT

Provided is an object shape detection apparatus that can detect the shape of a raised or depressed portion on the surface of an object. In accordance with a comparison result obtained by a reflection intensity comparator with regard to intensity of a horizontally polarized wave component and a vertically polarized wave component of a reflected wave, the object shape determiner detects the shape of the raised portion and the shape of the depressed portion of a detection target object. The object locator detects the position of the raised portion and the position of the depressed portion of the detection target object by measuring the distance to the raised portion and the distance to the depressed portion of the detection target object detected by the object shape determiner.

11 Claims, 4 Drawing Sheets

(51) Int. Cl.
*G01S 7/35* (2006.01)
*G01S 13/42* (2006.01)
*G01S 13/931* (2020.01)

(58) Field of Classification Search
CPC ... G01S 2013/0245; G01S 2013/93274; G01S 7/418; G01S 13/04; G01S 13/4454; G01S 7/41; G01S 7/412
See application file for complete search history.

(56) References Cited

U.S. PATENT DOCUMENTS

| | | | |
|---|---|---|---|
| 10,345,431 B1* | 7/2019 | Romines | G01S 7/024 |
| 2014/0210661 A1* | 7/2014 | Balaji | G01S 13/95 342/174 |
| 2017/0106861 A1* | 4/2017 | Oh | B60W 30/143 |
| 2018/0052229 A1* | 2/2018 | Ranney | G01S 13/885 |
| 2019/0195998 A1* | 6/2019 | Campbell | H01Q 1/3233 |

FOREIGN PATENT DOCUMENTS

| | | |
|---|---|---|
| JP | H0266482 A | 3/1990 |
| JP | H0357984 A | 3/1991 |
| JP | 2000285375 A | 10/2000 |
| JP | 2012073221 A | 4/2012 |
| JP | 2016004019 A | 1/2016 |
| WO | WO-2011033264 A4 * 5/2011 ............. G01S 13/02 |

OTHER PUBLICATIONS

Written Opinion issued in Application No. PCT/JP2018/041567, dated Dec. 11, 2018.

* cited by examiner

OBJECT SHAPE DETECTION APPARATUS, VEHICLE INCLUDING THE SAME, AND OBJECT SHAPE DETECTION METHOD

This is a continuation of International Application No. PCT/JP2018/041567 filed on Nov. 8, 2018 which claims priority from Japanese Patent Application No. 2018-031394 filed on Feb. 23, 2018. The contents of these applications are incorporated herein by reference in their entireties.

BACKGROUND

Technical Field

The present disclosure relates to an object shape detection apparatus that detects the shape of an object in accordance with a reflected wave of a radiated electromagnetic wave reflected back by the object, a vehicle including the same, and an object shape detection method.

As a known technology of this kind of object shape detection apparatus, for example, Patent Document 1 discloses a vehicle recognition apparatus. This vehicle recognition apparatus sends a vertically polarized wave component and a horizontally polarized wave component of an electromagnetic wave forward in a travel direction from antennas by using a transmitter. The electromagnetic wave is reflected by a target, a vertically polarized wave component and a horizontally polarized wave component of the electromagnetic wave are in turn received separately by antennas and detected by a wave detector. Poles, such as reflectors at the roadside strip are usually elongated in the vertical direction, and thus, the vertically polarized wave component of a wave reflected by the pole is relatively large and the horizontally polarized wave component is relatively small. By contrast, the vertically polarized wave component and the horizontally polarized wave component of a wave reflected by a vehicle are almost equal to each other. For this reason, a microprocessor compares the intensity of the vertically polarized wave component and the intensity of the horizontally polarized wave component of a received reflected wave with each other and accordingly determines whether a forward target is a vehicle or another kind of object, such as a reflector but a vehicle.

As another known technology, Patent Document 2 discloses an object detection apparatus. This object detection apparatus uses a radio wave receiving unit to receive a horizontally polarized wave component and a vertically polarized wave component of an electromagnetic wave emitted by a measurement target object and generate a horizontally polarized wave image and a vertically polarized wave image. Subsequently, by using an object recognition unit, the object detection apparatus calculates relative values indicating a relative relationship between the horizontally polarized wave component and the vertically polarized wave component with respect to positions on the horizontally polarized wave image and the vertically polarized wave image generated by the receiving unit and determines in accordance with the relative values whether the measurement target object is a three-dimensional object.

As still another known technology, Patent Document 3 discloses a meteorological radar apparatus. This meteorological radar apparatus transmits a horizontally polarized radio wave and a vertically polarized radio wave in an alternating manner at radar repeat cycle periods by using transmission means. The meteorological radar apparatus in turn receives reflected waves of the transmitted horizontally polarized radio wave and the transmitted vertically polarized radio wave by using reception means. Signal processing means removes unnecessary signal components from the horizontally polarized wave signal and the vertically polarized wave signal received by the reception means, and subsequently, calculates the average values of intensity with respect to both the signals and accordingly calculates a difference between the average values. When ice falls down, its shape is substantially round; but a raindrop is stretched in the horizontal direction due to air resistance and shaped into an ellipsoid. Between ice and rain, intensity of received horizontally polarized wave signal differs while intensity of vertically polarized wave signal does not change; thus, by calculating the difference between the average values, a signal corresponding to the shape difference of a target weather can be obtained. In accordance with the difference signal obtained by the signal processing means, a display device displays information about the shape difference of the target weather.

Patent Document 1: Japanese Unexamined Patent Application Publication No. 3-57984

Patent Document 2: Japanese Unexamined Patent Application Publication No. 2016-4019

Patent Document 3: Japanese Unexamined Patent Application Publication No. 1-282487

BRIEF SUMMARY

However, the known vehicle recognition apparatus disclosed in Patent Document 1 can recognize long slender objects relative to vehicles but cannot recognize the surface shape, such as a depressed portion or a raised portion on the surface of the object by using reflected waves.

The known object detection apparatus disclosed in Patent Document 2 can recognize whether a measurement target object is a three-dimensional object but cannot recognize it when the measurement target object per se is not a wave source that emits electromagnetic waves by itself. Thus, similarly to the vehicle recognition apparatus described in Patent Document 1, the object detection apparatus cannot recognize the surface shape, such as a depressed portion or a raised portion on the surface of the measurement target object by using reflected waves.

The known meteorological radar apparatus disclosed in Patent Document 3 focuses on the fact that snow is shaped like a sphere and rain is like an ellipsoid and accordingly distinguish shapes by using polarized wave characteristics. However, similarly to the apparatuses disclosed in Patent Documents 1 and 2, the meteorological radar apparatus cannot recognize the surface shape, such as a depressed portion or a raised portion on the surface of the measurement target object by using reflected waves.

The present disclosure implements an object shape detection apparatus including a transmitter configured to emit a horizontally polarized wave component and a vertically polarized wave component of an electromagnetic wave, a receiver configured to receive a horizontally polarized wave component and a vertically polarized wave component of a reflected wave reflected back by an object after being emitted by the transmitter, a reflection intensity comparator configured to compare an intensity of the horizontally polarized wave component of the reflected wave received by the receiver and an intensity of the vertically polarized wave component of the reflected wave received by the receiver with each other, and an object shape determiner configured to detect a shape of a raised portion of the object or a shape of a depressed portion of the object in accordance with a comparison result obtained by the reflection intensity comparator with regard to the intensity of the horizontally polarized wave component of the reflected wave and the intensity of the vertically polarized wave component of the reflected wave.

Furthermore, the present disclosure implements an object shape detection method including a step in which a transmitter emits a horizontally polarized wave component and a vertically polarized wave component of an electromagnetic wave, a step in which a receiver receives a horizontally polarized wave component and a vertically polarized wave component of a reflected wave reflected back by an object after being emitted by the transmitter, a step in which a reflection intensity comparator compares an intensity of the horizontally polarized wave component of the reflected wave received by the receiver and an intensity of the vertically polarized wave component of the reflected wave received by the receiver with each other, and a step in which an object shape determiner detects a shape of a raised portion of the object or a shape of a depressed portion of the object in accordance with a comparison result obtained by the reflection intensity comparator with regard to the intensity of the horizontally polarized wave component of the reflected wave and the intensity of the vertically polarized wave component of the reflected wave.

In the electromagnetic wave emitted by the transmitter, reflected by a raised portion of an object, and received by the receiver, there is a relatively small difference or no difference between the intensity of the horizontally polarized wave component and the intensity of the vertically polarized wave component. By contrast, in the electromagnetic wave reflected by a depressed portion of an object and received by the receiver, there is a relatively large difference between the intensity of the horizontally polarized wave component and the intensity of the vertically polarized wave component. Hence, with the configuration described above, in accordance with the comparison result obtained by the reflection intensity comparator with regard to the intensity of the horizontally polarized wave component of the reflected wave and the intensity of the vertically polarized wave component of the reflected wave, the object shape determiner can determine whether the detected surface of an object is a raised portion or a depressed portion.

Moreover, the present disclosure implements an object shape detection apparatus including a transmitter configured to emit, as a continuous wave, a horizontally polarized wave component and a vertically polarized wave component of an electromagnetic wave subjected to frequency modulation, a receiver configured to receive, with respect to individual frequencies, a horizontally polarized wave component and a vertically polarized wave component of a reflected wave reflected back by an object after being emitted by the transmitter, a reflection intensity comparator configured to compare, with respect to individual frequencies, an intensity of the horizontally polarized wave component of the reflected wave received by the receiver and an intensity of the vertically polarized wave component of the reflected wave received by the receiver, a variable narrow-band rejection filter configured to remove the reflected wave with a particular frequency at which there is a difference exceeding a predetermined threshold, the particular frequency being selected from frequencies at which it is determined by a comparison of the reflection intensity comparator that there are differences between the intensity of the horizontally polarized wave component and the intensity of the vertically polarized wave component, and a raised portion determiner configured to detect a raised portion of the object in accordance with the reflected wave which is selected from reflected waves having passed through the variable narrow-band rejection filter, the reflected waves each being the reflected wave, and in which there is a relatively small difference or no difference between the intensity of the horizontally polarized wave component and the intensity of the vertically polarized wave component, measure a distance to the raised portion in accordance with a frequency of the reflected wave used for detecting the raised portion, and detect a position of the raised portion.

Further, the present disclosure implements an object shape detection method including a step in which a transmitter emits, as a continuous wave, a horizontally polarized wave component and a vertically polarized wave component of an electromagnetic wave subjected to frequency modulation, a step in which a receiver receives, with respect to individual frequencies, a horizontally polarized wave component and a vertically polarized wave component of a reflected wave reflected back by an object after being emitted by the transmitter, a step in which a reflection intensity comparator compares, with respect to individual frequencies, an intensity of the horizontally polarized wave component of the reflected wave received by the receiver and an intensity of the vertically polarized wave component of the reflected wave received by the receiver with each other, a step in which a variable narrow-band rejection filter removes the reflected wave with a particular frequency at which there is a difference exceeding a predetermined threshold, the particular frequency being selected from frequencies at which it is determined by a comparison of the reflection intensity comparator that there are differences between the intensity of the horizontally polarized wave component and the intensity of the vertically polarized wave component, and a step in which a raised portion determiner detects a raised portion of the object in accordance with the reflected wave which is selected from reflected waves having passed through the variable narrow-band rejection filter, the reflected waves each being the reflected wave, and in which there is a relatively small difference or no difference between the intensity of the horizontally polarized wave component and the intensity of the vertically polarized wave component, measures a distance to the raised portion in accordance with a frequency of the reflected wave used for detecting the raised portion, and detects a position of the raised portion.

The intensity of a reflected wave reflected by a raised portion of an object after being emitted by the transmitter is usually lower than the intensity of a reflected wave reflected by a depressed portion of the object; in the case in which the raised portion and the depressed portion are situated close to each other, the reflected wave of the raised portion may be hidden by the reflected wave of the depressed portion. With the configuration described above, the variable narrow-band rejection filter removes a reflected wave with a particular frequency at which there is a difference exceeding a predetermined threshold. The particular frequency is selected from frequencies at which it is determined by a comparison of the reflection intensity comparator that there are differences between the intensity of the horizontally polarized wave component and the intensity of the vertically polarized wave component. Specifically, a reflected wave with a frequency at which there is a difference in intensity between the horizontally polarized wave component and the vertically polarized wave component and the difference exceeds the predetermined threshold is determined as a reflected wave reflected by a depressed portion that is included in an object, that is situated at a distance corresponding to the frequency of the difference exceeding the predetermined threshold, and which indicates a relatively high reflection intensity. Such a reflected wave is eliminated from a target for detection of object shape by the variable narrow-band rejection filter. As a result, a reflected wave with a relatively low signal intensity that is reflected by a raised portion of an object is exposed, and accordingly, it is possible to highly accurately detect the raised portion of a relatively lower signal intensity on the object by using the raised portion determiner. Further, as the beat frequency that is a frequency difference between a transmitting wave and a receiving wave decreases, the distance to an object decreases; hence, it is possible to highly accurately detect a raised portion situated relatively close to the object shape detection apparatus by targeting the raised portion with a relatively low beat frequency for shape detection, which is the raised portion situated relatively close to the object shape detection apparatus.

Furthermore, the present disclosure implements a vehicle including any of the object shape detection apparatuses described above.

The present disclosure can provide an object shape detection apparatus capable of detecting the shape of a raised portion or the shape of a depressed portion on the surface of an object, a vehicle including such an object shape detection apparatus, and an object shape detection method.

DETAILED DESCRIPTION

Next, embodiments of an object shape detection apparatus of the present disclosure are described.

Figure 1:
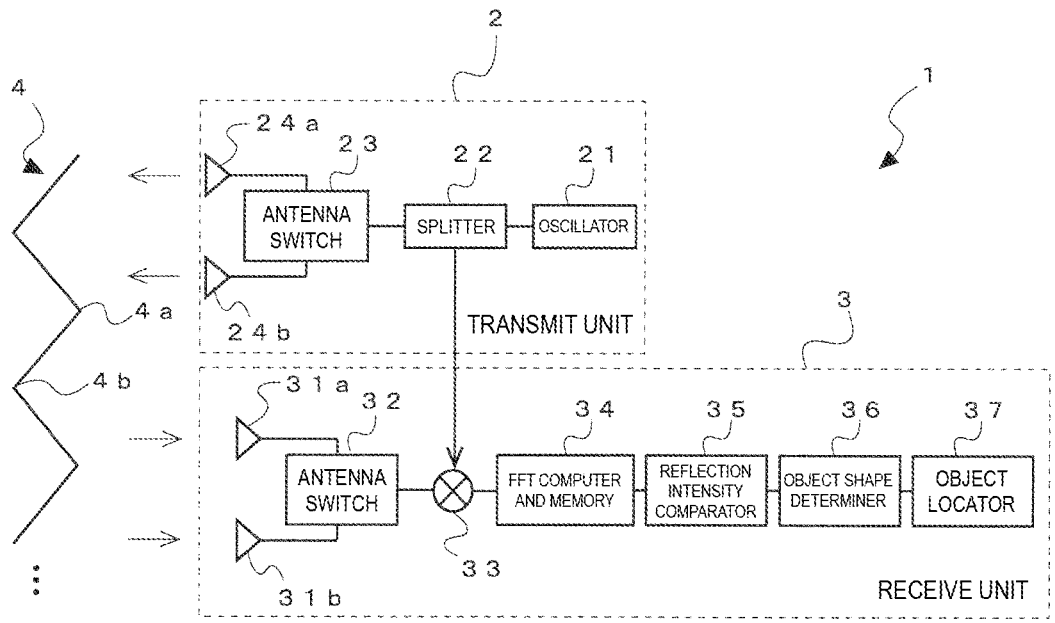
FIG. 1 is a block configuration diagram of an object shape detection apparatus according to a first embodiment of the present disclosure.

FIG. 1 is a block configuration diagram of an object shape detection apparatus 1 according to a first embodiment of the present disclosure.

The object shape detection apparatus 1 consists of a transmit unit 2 and a receive unit 3. The transmit unit 2 includes an oscillator 21, a splitter 22, an antenna switch 23, and a horizontally polarized wave transmit antenna 24a and a vertically polarized wave transmit antenna 24b. The oscillator 21 produces a high frequency signal in the GHz band. The high frequency signal is outputted to the antenna switch 23 via the splitter 22. The antenna switch 23 outputs a horizontally polarized wave component of the inputted high frequency signal to the horizontally polarized wave transmit antenna 24a and a vertically polarized wave component of the inputted high frequency signal to the vertically polarized wave transmit antenna 24b while switching between the antennas in a time division manner. As a result, an electromagnetic wave of the horizontally polarized wave component from the horizontally polarized wave transmit antenna 24a and an electromagnetic wave of the vertically polarized wave component from the vertically polarized wave transmit antenna 24b are emitted alternately at fixed time intervals. The transmit unit 2 constitutes a transmitter that emits a horizontally polarized wave component and a vertically polarized wave component of electromagnetic wave.

A detection target object 4 is irradiated with the electromagnetic wave emitted by the horizontally polarized wave transmit antenna 24a and the electromagnetic wave emitted by the vertically polarized wave transmit antenna 24b. A raised portion 4a and a depressed portion 4b exist on the surface of the detection target object 4 as illustrated in the drawing. The electromagnetic wave applied to the detection target object 4 is reflected by the detection target object 4 and then received by the receive unit 3.

The receive unit 3 includes a horizontally polarized wave receive antenna 31a and a vertically polarized wave receive antenna 31b, an antenna switch 32, a mixer 33, a fast Fourier transform (FFT) computer and computational result storing memory 34, a reflection intensity comparator 35, an object shape determiner 36, and an object locator 37. The FFT computer and computational result storing memory 34, the reflection intensity comparator 35, the object shape determiner 36, and the object locator 37 are configured as hardware of electronic circuit, software of program of microprocessor, or a combination of such hardware and software.

A horizontally polarized wave component of the electromagnetic wave received by the horizontally polarized wave receive antenna 31a and a vertically polarized wave component of the electromagnetic wave received by the vertically polarized wave receive antenna 31b are inputted to the receive unit 3 while the antenna switch 32 switches between the antennas in a time division manner. The antenna switch 32 accordingly outputs to the mixer 33 the horizontally polarized wave component of the electromagnetic wave received by the horizontally polarized wave receive antenna 31a and the vertically polarized wave component of the electromagnetic wave received by the vertically polarized wave receive antenna 31b in an alternating manner at fixed time intervals. The horizontally polarized wave receive antenna 31a and the vertically polarized wave receive antenna 31b, and the antenna switch 32 constitute a receiver that receives a horizontally polarized wave component and a vertically polarized wave component of a wave emitted by the transmitter and then reflected back by the detection target object 4.

The splitter 22 provides the mixer 33 with an oscillator output outputted by the oscillator 21 of the transmit unit 2. The mixer 33 mixes high frequency signals in the GHz band received by the horizontally polarized wave receive antenna 31a and the vertically polarized wave receive antenna 31b with the oscillator output provided by the splitter 22 so as to decrease the received high frequency signals in the GHz band to intermediate frequency (IF) signals in the MHz band and outputs the resultant signals to the FFT computer and computational result storing memory 34. The FFT computer and computational result storing memory 34 subjects the inputted IF signals to FFT so that time signals are converted into frequency signals. The IF signal of the horizontally polarized wave component of the reflected wave received by the horizontally polarized wave receive antenna 31a is temporarily stored as primary data in the memory of the FFT computer and computational result storing memory 34 and the IF signal of the vertically polarized wave component of the reflected wave received by the vertically polarized wave receive antenna 31b is temporarily stored as secondary data in the same memory. The IF signals of the horizontally polarized wave component and the vertically polarized wave component of the reflected wave have the following relationship.

Figure 2:
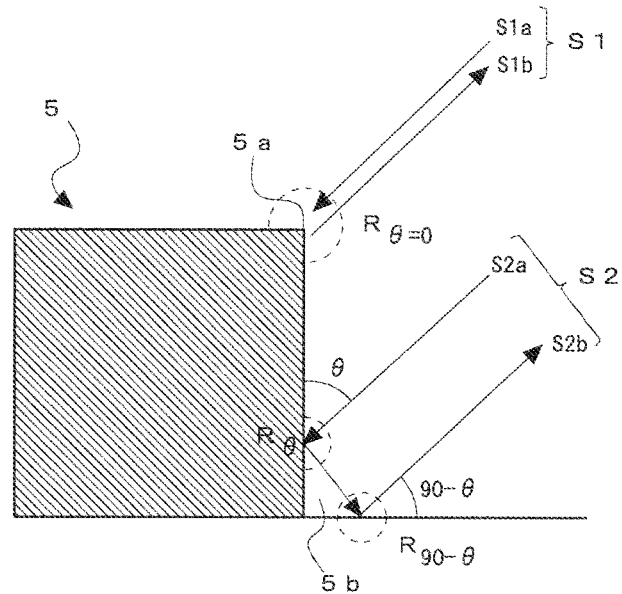
FIG. 2 is an illustration for explaining reflection modes when a radio wave strikes an object having a depressed portion and a raised portion and is reflected by the object.

When a radio wave reaches an object 5 as illustrated in FIG. 2 and a radio wave S1a strikes a raised portion 5a of the object 5, the radio wave S1a is changed in direction once at a part circled by a dashed line illustrated in the drawing and a reflected wave S1b is reflected back with respect to the direction in which the radio wave has come. When a radio wave S2a strikes a depressed portion 5b of the object 5, the radio wave S2a is changed in direction twice at two parts circled by dashed lines illustrated in the drawing and a reflected wave S2b is reflected back with respect to the direction in which the radio wave has come. Here, when an incident angle of the radio waves S1a and S2a striking the object 5 as illustrated in the drawing is 0 [deg], a reflection rate R of a radio wave S1 that strikes the raised portion 5a and is changed in direction once is expressed as $R_\theta$ in accordance with the incident angle θ. A reflection rate R of a radio wave S2 that strikes the depressed portion 5b and is changed in direction twice is expressed as $R_\theta \cdot R_{90-\theta}$ in accordance with the incident angle θ, which is the product of a reflection rate $R_\theta$ when the radio wave S2 is firstly changed in direction and a reflection rate $R_{90-\theta}$ when the radio wave S2 is secondly changed in direction.

Figure 3A:
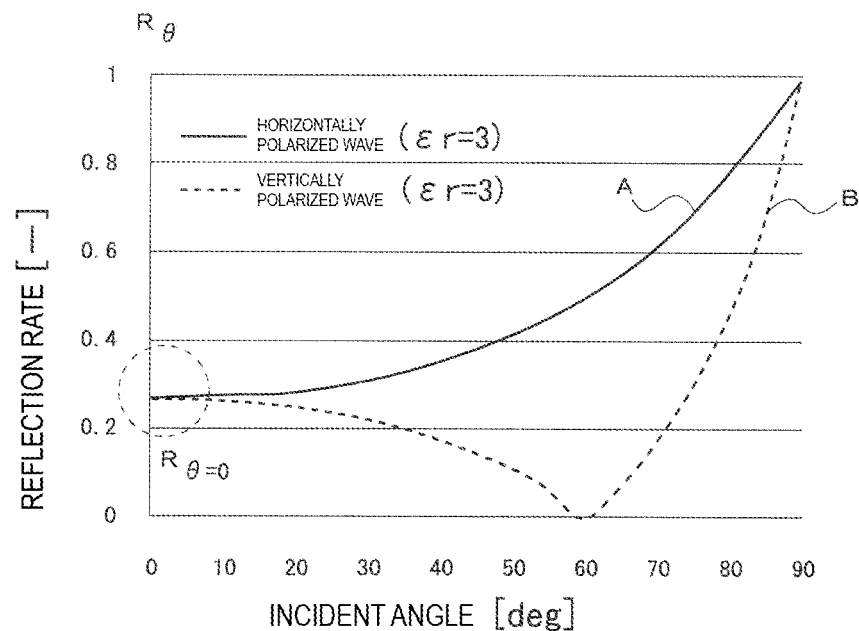
FIG. 3A is a graph illustrating reflection rates with respect to incident angles of a horizontally polarized wave component and a vertically polarized wave component in the mode in which a radio wave strikes a raised portion of an object and is reflected by the raised portion and FIG. 3B a graph illustrating reflection rates with respect to incident angles of a horizontally polarized wave component and a vertically polarized wave component in the mode in which a radio wave strikes a depressed portion of an object and is reflected by the depressed portion.
Figure 3B:
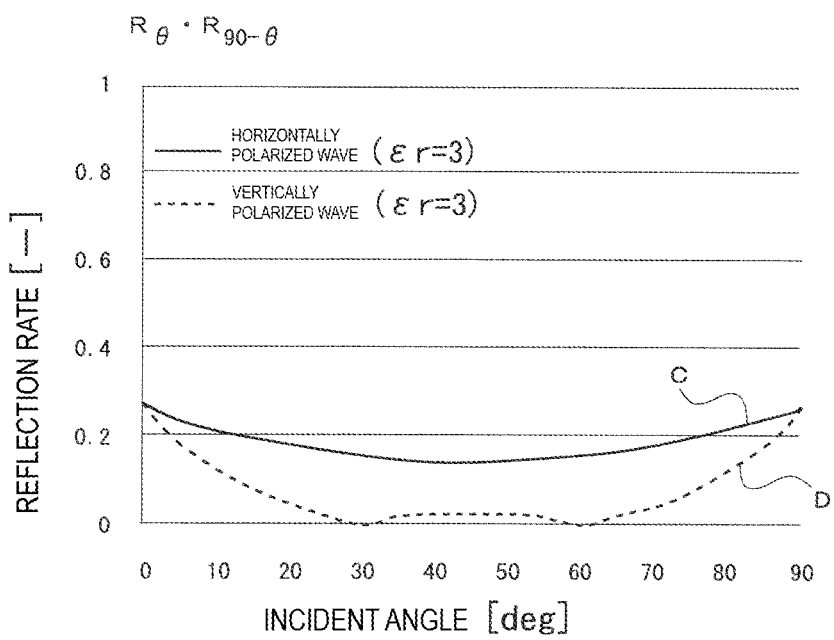

A graph in FIG. 3A illustrates the reflection characteristic of the radio wave S1 that is reflected by the raised portion 5a, in which a characteristic line A presented by a solid line indicates the reflection characteristic of the horizontally polarized wave component of the radio wave S1 and a characteristic line B presented by a dashed line indicates the reflection characteristic of the vertically polarized wave component of the radio wave S1. A graph in FIG. 3B illustrates the reflection characteristic of the radio wave S2 that is reflected by the depressed portion 5b, in which a characteristic line C presented by a solid line indicates the reflection characteristic of the horizontally polarized wave component of the radio wave S2 and a characteristic line D presented by a dashed line indicates the reflection characteristic of the vertically polarized wave component of the radio wave S2. In these graphs, the horizontal axes indicate the incident angle θ [deg] and the vertical axes indicate the reflection rate R [–]. The permittivity εr of the object 5 is 3 (εr=3).

As indicated by the characteristic lines A and B in the graph in FIG. 3A, as for the radio wave S1 that is reflected by the raised portion 5a, no difference regarding polarized waves is seen between the horizontally polarized wave component and the vertically polarized wave component at a part close to 0° of the incident angle θ ($R_\theta$=0), which is circled by a dashed line. By contrast, as indicated by the characteristic lines C and D in the graph in FIG. 3B, as for the radio wave S2 that is reflected by the depressed portion 5b, a difference regarding polarized waves is seen between the horizontally polarized wave component and the vertically polarized wave component at every incident angle θ. In particular, the reflection rate R of the vertically polarized wave component is relatively small at a part in which θ=approximately 15° to 75°, and thus, relatively large differences relative to the reflection rate R of the horizontally polarized wave component are seen. This means that, as for the reflection intensity of the radio wave S1 at the raised portion 5a of the object 5, the difference regarding polarized waves is not present or relatively small between the horizontally polarized wave component and the vertically polarized wave component; as for the reflection intensity of the radio wave S2 at the depressed portion 5b, relatively large differences regarding polarized waves appear between the horizontally polarized wave component and the vertically polarized wave component. Hence, the raised portion and the depressed portion on the surface of the object are recognized by calculating the difference or rate of reflection intensity regarding polarized waves when the incident angle θ is 0° with regard to the raised portion 5a because the reflected wave is returned only when the incident angle θ is 0° or when the incident angle θ is in the range of 15° to 75° with regard to the depressed portion 5b because the reflected wave is returned when the incident angle θ is a given angle in the range of 15° to 75°.

Thus, in the object shape detection apparatus 1 according to the present embodiment, the reflection intensity comparator 35 compares the intensity of the horizontally polarized wave component of the reflected wave received by the horizontally polarized wave receive antenna 31a and the intensity of the vertically polarized wave component of the reflected wave received by the vertically polarized wave receive antenna 31b, which are calculated by the FFT computer and computational result storing memory 34 and stored in the memory. In accordance with the comparison result obtained by the reflection intensity comparator 35 with regard to intensity of the horizontally polarized wave component and the vertically polarized wave component of the reflected wave, the object shape determiner 36 detects the shape of the raised portion 4a and the shape of the depressed portion 4b of the detection target object 4. Specifically, according to the comparison result obtained by the reflection intensity comparator 35 with regard to intensity of the horizontally polarized wave component and the vertically polarized wave component of the reflected wave, in the case in which there is a relatively large difference of reflection intensity when the incident angle θ of polarized waves is in the range of 15° to 75°, it is determined that the depressed portion 4b is detected on the detection target object 4. By contrast, in the case in which there is a relatively small difference or no difference of reflection intensity when the incident angle θ of polarized waves is 0°, it is determined that the raised portion 4a is detected on the detection target object 4. The object locator 37 detects the position of the raised portion 4a and the position of the depressed portion 4b of the detection target object 4 by measuring the distance to the raised portion 4a and the distance to the depressed portion 4b of the detection target object 4 detected by the object shape determiner 36.

The object shape detection apparatus 1 according to the present embodiment employs an object shape detection method including a step in which the transmit unit 2 emits a horizontally polarized wave component and a vertically polarized wave component of a radio wave, a step in which the receive unit 3 receives a horizontally polarized wave component and a vertically polarized wave component of a reflected wave reflected back by the detection target object 4 after being emitted by the transmit unit 2, a step in which the reflection intensity comparator 35 compares the intensity of the horizontally polarized wave component and the intensity of the vertically polarized wave component of the reflected wave received by the receive unit 3 with each other, and a step in which the object shape determiner 36 detects the shape of the raised portion 4a or the depressed portion 4b on the detection target object 4 in accordance with the comparison result obtained by the reflection intensity comparator 35 with regard to the intensity of the horizontally polarized wave component and the intensity of the vertically polarized wave component of the reflected wave.

In the object shape detection apparatus 1 and the object shape detection method according to the first embodiment, it is possible to determine whether the surface of the detection target object 4 that is detected is the raised portion 4a or the depressed portion 4b by using the object shape determiner 36 in accordance with the comparison result obtained by the reflection intensity comparator 35 with regard to the intensity of the horizontally polarized wave component and the intensity of the vertically polarized wave component of the reflected wave. Furthermore, it is possible to detect, by using the object locator 37, the position of the raised portion 4a and the position of the depressed portion 4b on the surface of the detection target object 4 detected by the object shape determiner 36. As a result, it is possible to determine the surface of the detection target object 4 is the raised portion 4a or the depressed portion 4b with respect to each detection position. By determining whether each detection position, that is, each reflection point of the detection target object 4 is the raised portion 4a or the depressed portion 4b, it is possible to grasp the rough outline of the object by using the object shape determiner 36.

As described above, the present disclosure is characterized in the object locator that measures the distance to a raised or depressed portion of an object detected by the object shape determiner and accordingly detects the position of the raised or depressed portion.

With this configuration, it is possible to detect, by using the object locator, the position of a raised or depressed portion on the surface of an object detected by the object shape determiner. As a result, it is possible to determine the surface of the object is a raised or depressed portion with respect to each detection position. By determining whether each detection position, that is, each reflection point of the object is a raised or depressed portion, it is possible to grasp the rough outline of the object by using the object shape determiner.

It should be noted that, while in the first embodiment the object shape determiner 36 firstly determines the shape of the detection target object 4 and the object locator 37 secondly determines the position of the shape, the configuration may be made such that the object locator 37 firstly determines the position of a detection portion and the object shape determiner 36 secondly determines the shape of the detection target object at the position.

Figure 4:
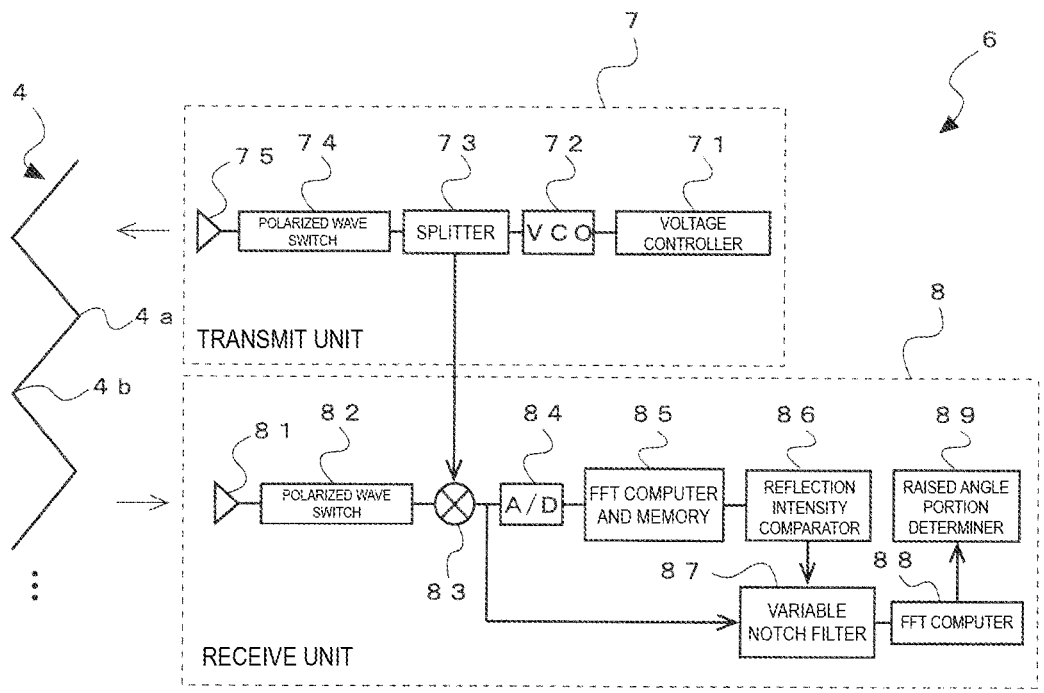
FIG. 4 is a block configuration diagram of an object shape detection apparatus according to a second embodiment of the present disclosure.

Next, an object shape detection apparatus 6 according to a second embodiment of the present disclosure is described with reference to a block configuration diagram illustrated in FIG. 4.

The object shape detection apparatus 6 is a frequency modulated continuous wave (FMCW) radar consisting of a transmit unit 7 and a receive unit 8. The transmit unit 7 includes a voltage controller 71, a voltage-controlled oscillator (VCO) 72, a splitter 73, a polarized wave switch 74, and a horizontally and vertically polarized waves dual transmit antenna 75. The VCO 72 produces a modulated high frequency signal in the GHz band that has been subjected to frequency modulation because the voltage controller 71 controls the voltage applied to the VCO 72. The high frequency signal is outputted to the polarized wave switch 74 via the splitter 73. The polarized wave switch 74 outputs a horizontally polarized wave component and a vertically polarized wave component of the inputted high frequency signal to the horizontally and vertically polarized waves dual transmit antenna 75 while switching between a horizontally polarized wave component and a vertically polarized wave component in a time division manner. As a result, an electromagnetic wave of the horizontally polarized wave component subjected to frequency modulation and an electromagnetic wave of the vertically polarized wave component subjected to frequency modulation are alternately emitted from the horizontally and vertically polarized waves dual transmit antenna 75 at fixed time intervals. The transmit unit 7 constitutes a transmitter that emits, as a continuous wave, a horizontally polarized wave component and a vertically polarized wave component of an electromagnetic wave subjected to frequency modulation.

The detection target object 4 is irradiated with the electromagnetic wave emitted by the horizontally and vertically polarized waves dual transmit antenna 75. The raised portion 4a and the depressed portion 4b exist on the surface of the detection target object 4 as illustrated in the drawing. The electromagnetic wave applied to the detection target object 4 is reflected by the detection target object 4 and then received by the receive unit 8.

The receive unit 8 includes a horizontally and vertically polarized waves dual receive antenna 81, a polarized wave switch 82, a mixer 83, an analog-to-digital (A/D) converter 84, an FFT computer and computational result storing memory 85, a reflection intensity comparator 86, a variable notch filter 87, an FFT computer 88, and a raised angle portion determiner 89. The FFT computer and computational result storing memory 85, the reflection intensity comparator 86, the variable notch filter 87, the FFT computer 88, and the raised angle portion determiner 89 are configured as hardware of electronic circuit, software of program of microprocessor, or a combination of such hardware and software.

A horizontally polarized wave component and a vertically polarized wave component of the electromagnetic wave received by the horizontally and vertically polarized waves dual receive antenna 81 are inputted to the receive unit 8 with respect to individual frequencies while the polarized wave switch 82 switches between a horizontally polarized wave component and a vertically polarized wave component in a time division manner. The polarized wave switch 82 then outputs to the mixer 83 the horizontally polarized wave component and the vertically polarized wave component of the electromagnetic wave received by the horizontally and vertically polarized waves dual receive antenna 81 in an alternating manner at fixed time intervals. The horizontally and vertically polarized waves dual receive antenna 81, and the polarized wave switch 82 constitute a receiver that receives with respect to individual frequencies a horizontally polarized wave component and a vertically polarized wave component of a wave emitted by the transmitter and then reflected back by the detection target object 4.

The splitter 73 provides the mixer 83 with an oscillator output outputted by the VCO 72 of the transmit unit 2. The mixer 83 mixes a high frequency signal in the GHz band received by the horizontally and vertically polarized waves dual receive antenna 81 with the oscillator output provided by the splitter 73 so as to decrease the received high frequency signal in the GHz band to an IF signal in the MHz band and outputs the IF signal to the A/D converter 84 and the variable notch filter 87 with respect to individual frequencies of reflected wave. The A/D converter 84 converts the analog IF signal outputted by the mixer 83 to a digital signal and outputs the digital signal to the FFT computer and computational result storing memory 85. The FFT computer and computational result storing memory 85 subjects the converted digital IF signal to FFT with respect to individual frequencies of reflected wave so that a time signal is converted into a frequency signal. The IF signal of the horizontally polarized wave component of the reflected wave switched by the polarized wave switch 82 is temporarily stored as primary data in the memory of the FFT computer and computational result storing memory 85 with respect to individual frequencies of reflected wave and the IF signal of the vertically polarized wave component of the reflected wave switched by the polarized wave switch 82 is temporarily stored as secondary data in the same memory.

The reflection intensity comparator 86 retrieves, with respect to individual frequencies of reflected wave, the horizontally polarized wave component and the vertically polarized wave component of the reflected wave temporarily stored in the FFT computer and computational result storing memory 85 and compares, with respect to individual frequencies of reflected wave, the intensity of the horizontally polarized wave component with the intensity of the vertically polarized wave component of the reflected wave received by the receiver. Subsequently, the reflection intensity comparator 86 controls the variable notch filter 87 to remove a particular frequency at which there is a difference exceeding a predetermined threshold from frequencies at which there are differences in intensity between the horizontally polarized wave component and the vertically polarized wave component. The variable notch filter 87 constitutes a variable narrow-band rejection filter that removes a reflected wave with a particular frequency at which there is a difference exceeding a predetermined threshold, the particular frequency being selected from frequencies at which it is determined by the comparison of the reflection intensity comparator 86 that there are differences between the intensity of the horizontally polarized wave component and the intensity of the vertically polarized wave component. As described above, as for the reflection intensity of the radio wave at the raised portion 4a of the detection target object 4, the difference regarding polarized waves is relatively small or not present between the horizontally polarized wave component and the vertically polarized wave component; as for the reflection intensity of the radio wave at the depressed portion 4b, relatively large differences regarding polarized waves appear between the horizontally polarized wave component and the vertically polarized wave component.

The IF signal outputted by the mixer 83 is inputted to the variable notch filter 87. The IF signals at frequencies other than the particular frequency removed by the variable notch filter 87 are inputted to the FFT computer 88. At the particular frequency there is a difference in intensity between the horizontally polarized wave component and the vertically polarized wave component and the difference exceeds the predetermined threshold. The FFT computer 88 subjects the inputted IF signals to FFT so that time signals are converted into frequency signals. The raised angle portion determiner 89 detects the raised portion 4a of the detection target object 4 in accordance with a particular IF signal of a reflected wave which is selected from reflected waves having passed through the variable notch filter 87 and in which there is relatively small difference or no difference between the intensity of the horizontally polarized wave component and the intensity of the vertically polarized wave component. Subsequently, the raised angle portion determiner 89 measures the distance to the raised portion 4a in accordance with the frequency of the particular IF signal of the reflected wave used for detecting the raised portion 4a and accordingly detects the position of the raised portion 4a.

The intensity of a reflected wave reflected by the raised portion 4a of the detection target object 4 after being emitted by the transmit unit 7 is usually lower than the intensity of a reflected wave reflected by the depressed portion 4b of the detection target object 4; in the case in which the raised portion 4a and the depressed portion 4b are situated close to each other, the reflected wave of the raised portion 4a may be hidden by the reflected wave of the depressed portion 4b. In the object shape detection apparatus 6 according to the second embodiment, the variable notch filter 87 removes a reflected wave with a particular frequency at which there is a difference exceeding a predetermined threshold, the particular frequency being selected from frequencies at which it is determined by the comparison of the reflection intensity comparator 86 that there are differences between the intensity of the horizontally polarized wave component and the intensity of the vertically polarized wave component. This means that a reflected wave with a frequency at which there is a difference in intensity between the horizontally polarized wave component and the vertically polarized wave component and the difference exceeds the predetermined threshold is determined as a reflected wave reflected by the depressed portion 4b that is included in the detection target object 4, that is situated at a distance corresponding to the frequency of the difference exceeding the predetermined threshold, and which indicates a relatively high reflection intensity. Such a reflected wave is eliminated from a target for detection of object shape by the variable notch filter 87. As a result, a reflected wave with a relatively low signal intensity that is reflected by the raised portion 4a of the detection target object 4 is exposed, and accordingly, it is possible to highly accurately detect the raised portion 4a of a relatively lower signal intensity on the detection target object 4 by using the raised angle portion determiner 89. Further, as the beat frequency that is a frequency difference between a transmitting wave and a receiving wave decreases, the distance to the detection target object 4 decreases; hence, it is possible to highly accurately detect the raised portion 4a situated relatively close to the object shape detection apparatus 6 by targeting the raised portion 4a with a relatively low beat frequency for shape detection, which is the raised portion 4a situated relatively close to the object shape detection apparatus 6.

The object shape detection apparatus 6 according to the second embodiment employs an object shape detection method including a step in which the transmit unit 7 emits, as a continuous wave, a horizontally polarized wave component and a vertically polarized wave component of an electromagnetic wave subjected to frequency modulation, a step in which the receive unit 8 receives, with respect to individual frequencies, a horizontally polarized wave component and a vertically polarized wave component of a reflected wave reflected back by the detection target object 4 after being emitted by the transmit unit 7, a step in which the reflection intensity comparator 86 compares, with respect to individual frequencies, the intensity of the horizontally polarized wave component and the intensity of the vertically polarized wave component of the reflected wave received by the receive unit 8 with each other, a step in which the variable notch filter 87 removes a reflected wave with a particular frequency at which there is a difference exceeding a predetermined threshold, the particular frequency being selected from frequencies at which it is determined by the comparison of the reflection intensity comparator 86 that there are differences between the intensity of the horizontally polarized wave component and the intensity of the vertically polarized wave component, and a step in which the raised angle portion determiner 89 detects the raised portion 4a of the detection target object 4 in accordance with a reflected wave which is selected from reflected waves having passed through the variable notch filter 87 and in which there is a relatively small difference or no difference between the intensity of the horizontally polarized wave component and the intensity of the vertically polarized wave component, measures the distance to the raised portion 4a in accordance with the frequency of the particular IF signal of the reflected wave used for detecting the raised portion 4a, and accordingly detects the position of the raised portion 4a.

INDUSTRIAL APPLICABILITY

Figure 5:
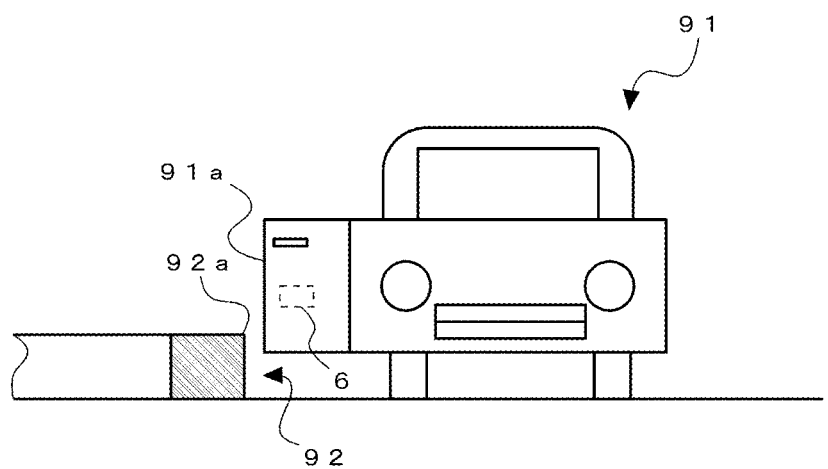
FIG. 5 is an illustration for explaining an example of using the object shape detection apparatus according to the second embodiment.

The object shape detection apparatus 6 according to the second embodiment can be provided inside a door 91a of a vehicle, such as the automobile 91 as illustrated in FIG. 5 and used for detecting an obstacle when the door 91a is opened or closed. Specifically, when the automobile 91 stops beside a curb 92 and the door 91a is opened without necessarily attention on the curb 92, the door 91a hits a raised portion 92a of the curb 92 and the door 91a gets damaged. In this case, if the object shape detection apparatus 6 according to the second embodiment is installed in the automobile 91, the object shape detection apparatus 6 can detect the raised portion 92a of the curb 92 situated relatively close to the object shape detection apparatus 6 in the manner described above. When the object shape detection apparatus 6 detects the raised portion 92a of the curb 92, for example, the alarm is sounded, and as a result, it is possible to prevent the door 91a from hitting the raised portion 92a of the curb 92 and getting damaged.

Moreover, when the object shape detection apparatus 1 according to the first embodiment is installed in a vehicle, such as the automobile 91, the object shape detection apparatus 1 detects a depressed or raised portion of an object around a vehicle or on the road surface; as a result, it is possible to precisely grasp circumstances of the area around the driving road or road surface conditions, which can be used as information for assisting driving.

Further, as indicated in the graph in FIG. 3B, as for the radio wave S2 that is reflected by the depressed portion 5b, marked differences regarding polarized waves are seen between the horizontally polarized wave component and the vertically polarized wave component when the incident angle θ is in the range of 30° to 60°. When the incident angle θ of the radio wave S2 is in the range of 30° to 60°, the height L of the transmit units 2 and 7 is given by the following Expression (1).

$$\frac{\sqrt{3}}{3} \cdot x \leq L \leq \sqrt{3} \cdot x \quad (1)$$

Figure 6A:
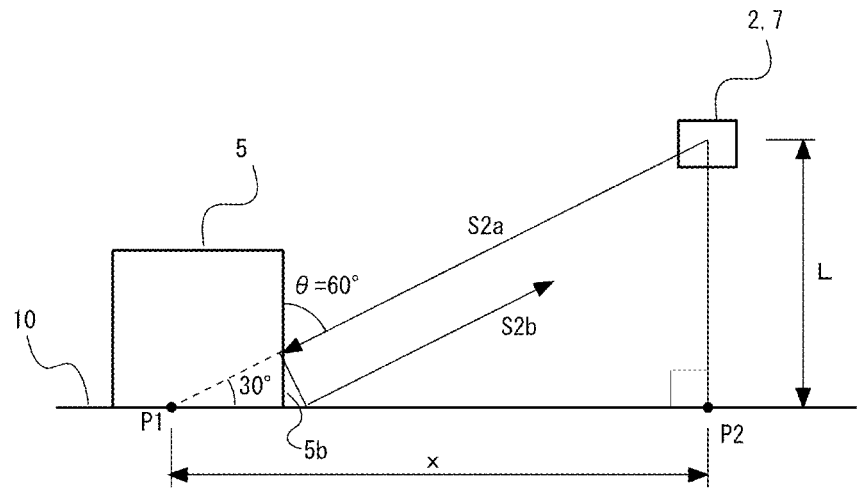
FIGS. 6A and 6B provides illustrations for explaining a desirable placement height of a transmit unit in the object shape detection apparatuses of the embodiments.
Figure 6B:
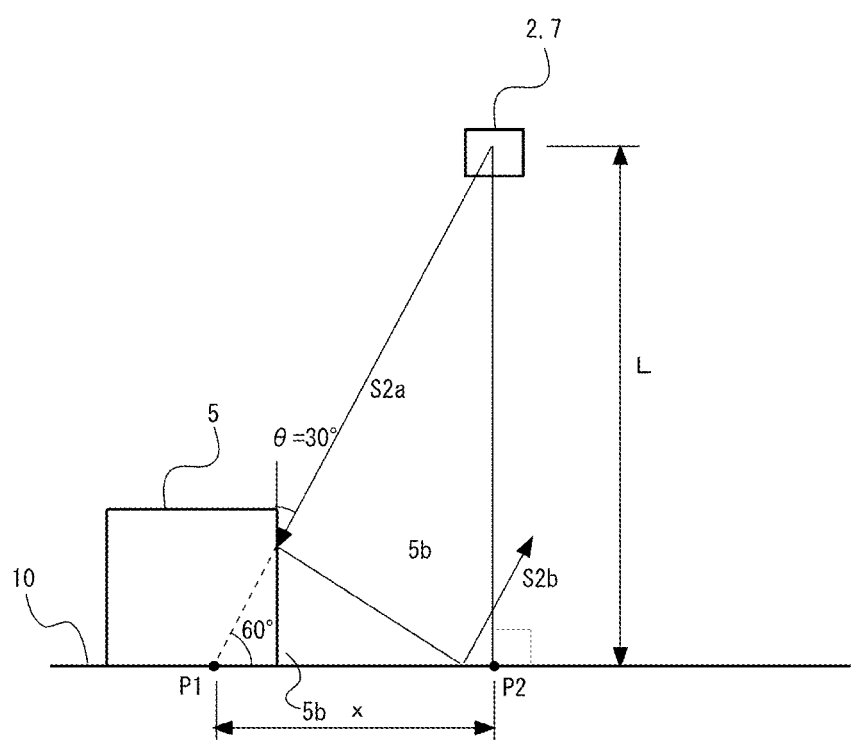

In Expression (1) indicated above, as illustrated in FIGS. 6A and 6B, x is a horizontal distance from an imaginary position P1 to a placement position P2, where the imaginary position P1 is a position at which a line formed by extending the path of an incident wave S2a of the radio wave S2 emitted by the transmit unit 2 or 7 and striking the depressed portion 5b of the object 5 crosses a mounting surface 10 on which the object 5 is mounted and the placement position P2 is a position at which the transmit unit 2 or 7 is placed. The transmit unit 2 or 7 is placed at the height L from the placement position P2 in the direction perpendicular to the mounting surface 10. FIG. 6A indicates the placement height L of the transmit units 2 and 7 when the incident angle θ of the radio wave S2 is 60°; the placement height L in this case is calculated in accordance with the following Expression (2).

$$\tan 30° = L/x = \frac{1}{\sqrt{3}} \quad (2)$$

$$\therefore L = \frac{x}{\sqrt{3}} = \frac{\sqrt{3}}{3} \cdot x$$

FIG. 6B indicates the placement height L of the transmit units 2 and 7 when the incident angle θ of the radio wave S2 is 30°; the placement height L in this case is calculated in accordance with the following Expression (3).

$$\tan 60° = L/x = \frac{\sqrt{3}}{1} \quad (3)$$

$$\therefore L = \sqrt{3} \cdot x$$

As described above, in the case in which the placement height L of the transmit units 2 and 7 is in the range given by Expression (1), the object shape detection apparatus 1 according to the first embodiment and the object shape detection apparatus 6 according to the second embodiment, which are, for example, installed in a vehicle, such as the automobile 91, can more accurately detect the depressed portion 5b of the object 5 because marked differences regarding polarized waves appear between the horizontally polarized wave component and the vertically polarized wave component of the incident wave S2a striking the object 5. For this reason, the placement height L of the transmit units 2 and 7 of the object shape detection apparatuses 1 and 6 can be set within the range given by Expression (1).

REFERENCE SIGNS LIST 1, 6 object shape detection apparatus
2, 7 transmit unit
3, 8 receive unit
4 detection target object
4a, 5a raised portion
4b, 5b depressed portion
5 object
21 oscillator
22, 73 splitter
23, 32 antenna switch
24a horizontally polarized wave transmit antenna
24b vertically polarized wave transmit antenna
31a horizontally polarized wave receive antenna
31b vertically polarized wave receive antenna
33, 83 mixer
34, 85 FFT computer and computational result storing memory
35, 86 reflection intensity comparator
36 object shape determiner 37 object locator
71 voltage controller
72 voltage controlled oscillator (VCO)
74, 82 polarized wave switch
75 horizontally and vertically polarized waves dual transmit antenna
81 horizontally and vertically polarized waves dual receive antenna
84 A/D converter
87 variable notch filter (variable narrow-band rejection filter)
88 FFT computer
89 raised angle portion determiner (raised portion determiner)

The invention claimed is:

1. An object shape detection apparatus comprising:
a transmitter configured to emit horizontally polarized and vertically polarized wave components of an electromagnetic wave;
a receiver configured to receive horizontally polarized and vertically polarized wave components of a reflected wave, the reflected wave being a reflection of the electromagnetic wave from an object after the electromagnetic wave is emitted by the transmitter; and
at least one circuit or processor configured to:
compare an intensity of the horizontally polarized wave component of the reflected wave to an intensity of the vertically polarized wave component of the reflected wave, and
determine a shape of a raised portion on a surface of the object or a shape of a depressed portion on a surface of the object based on the compared intensities.

2. The object shape detection apparatus according to claim 1, wherein the at least one circuit or processor is further configured to:
measure a distance from the receiver to the raised portion or the depressed portion of the object, and
determine a position of the raised portion or the depressed portion of the object.

3. An object shape detection apparatus comprising:
a transmitter configured to emit, as a continuous wave, horizontally polarized and vertically polarized wave components of an electromagnetic wave subjected to frequency modulation;
a receiver configured to receive, with respect to individual frequencies, horizontally polarized and vertically polarized wave components of a reflected wave, the reflected wave being a reflection of the electromagnetic wave from an object after the electromagnetic wave is emitted by the transmitter;
at least one circuit or processor configured to compare, with respect to the individual frequencies, an intensity of the horizontally polarized wave component of the reflected wave to an intensity of the vertically polarized wave component of the reflected wave; and
a variable narrow-band rejection filter configured to remove a frequency of the reflected wave at which there is a difference, that exceeds a predetermined threshold, between the intensity of the horizontally polarized wave component and the intensity of the vertically polarized wave component,
wherein the at least one circuit or processor is further configured to:
determine a raised portion of the object based on a selected reflected wave that passed through the variable narrow-band rejection filter, and for which there is no difference between the intensity of the horizontally polarized wave component and the intensity of the vertically polarized wave component,
measure a distance to the raised portion based on a frequency of the selected reflected wave used for detecting the raised portion, and
determine a position of the raised portion.

4. The object shape detection apparatus according to claim 1, wherein:
the transmitter is at a height L in a direction perpendicular to a mounting surface on which the object is mounted, L being in a range given as:

$$\frac{\sqrt{3}}{3} \cdot x \leq L \leq \sqrt{3} \cdot x, \quad (1)$$

x is a horizontal distance from an imaginary position to a position of the transmitter, and
the imaginary position is a position at which a line extending on a path of the emitted electromagnetic wave intersects the mounting surface.

5. The object shape detection apparatus according to claim 3, wherein:
the transmitter is at a height L in a direction perpendicular to a mounting surface on which the object is mounted, L being in a range given as:

$$\frac{\sqrt{3}}{3} \cdot x \leq L \leq \sqrt{3} \cdot x, \quad (1)$$

x is a horizontal distance from an imaginary position to a position of the transmitter, and
the imaginary position is a position at which a line extending on a path of the emitted electromagnetic wave intersects the mounting surface.

6. A vehicle comprising the object shape detection apparatus according to claim 1.

7. A vehicle comprising the object shape detection apparatus according to claim 3.

8. An object shape detection method comprising:
emitting horizontally polarized and vertically polarized wave components of an electromagnetic wave;
receiving horizontally polarized and vertically polarized wave components of a reflected wave, the reflected wave being a reflection of the electromagnetic wave from an object after the electromagnetic wave is emitted by the transmitter;
comparing an intensity of the horizontally polarized wave component of the reflected wave to an intensity of the vertically polarized wave component of the reflected wave; and
determining a shape of a raised portion on a surface of the object or a shape of a depressed portion on a surface of the object based on the compared intensities.

9. The object shape detection method according to claim 8, further comprising:
measuring a distance from the receiver to the raised portion or the depressed portion of the object, and
determining a position of the raised portion or the depressed portion of the object.

10. The object shape detection method according to claim 8, wherein:
the transmitter is at a height L in a direction perpendicular to a mounting surface on which the object is mounted, L being in a range given as:

$$\frac{\sqrt{3}}{3} \cdot x \leq L \leq \sqrt{3} \cdot x, \quad (1)$$

x is a horizontal distance from an imaginary position to a position of the transmitter, and
the imaginary position is a position at which a line extending on a path of the emitted electromagnetic wave intersects the mounting surface.

11. A vehicle configured to execute the object shape detection method according to claim 8.

\* \* \* \* \*